United States Patent [19]

Lixenfeld et al.

[11] 3,831,379
[45] Aug. 27, 1974

[54] CONTROL APPARATUS FOR A HYDRAULIC MACHINE

[75] Inventors: Manfred Lixenfeld, Ludwigsburg; Karl Reiff, Sersheim, both of Germany

[73] Assignee: Robert Bosch GmbH, Stuttgart, Germany

[22] Filed: June 7, 1971

[21] Appl. No.: 150,695

[30] Foreign Application Priority Data
June 13, 1970 Germany............................ 2029239

[52] U.S. Cl. ...................... 60/446, 91/401, 91/417, 91/452, 91/469
[51] Int. Cl. ... F15b 15/22, F15b 15/17, F16h 39/46
[58] Field of Search ............. 91/234, 401, 468, 469; 60/446, 452

[56] References Cited
UNITED STATES PATENTS

| | | | |
|---|---|---|---|
| 2,839,665 | 6/1958 | Wolfbauer.............................. | 91/401 |
| 3,125,319 | 3/1964 | Arbogast et al....................... | 91/468 |
| 3,153,965 | 10/1964 | Muhlbach.............................. | 91/401 |
| 3,296,797 | 1/1967 | Tlusty.................................... | 91/468 |
| 3,376,790 | 4/1968 | Matson.................................. | 91/234 |
| 3,376,793 | 4/1968 | Papadia et al. ....................... | 91/468 |

FOREIGN PATENTS OR APPLICATIONS

| | | | |
|---|---|---|---|
| 1,450,686 | 3/1969 | Germany.............................. | 60/452 |

*Primary Examiner*—Paul E. Maslousky
*Attorney, Agent, or Firm*—Michael S. Striker

[57] ABSTRACT

The normal regulation of a pump is effected under the control of a differential piston forming in a cylinder, an annular chamber directly communicating with a pressure conduit of the pump, and a cylinder chamber connected by a pressure-responsive valve with the pressure conduit. The piston has a conduit connecting the cylindrical chamber with a port cooperating with a control edge of the cylinder. At very high pressure in the pressure conduit of the pump, the piston moves to a position in which the port is uncovered by the control edge, and the pressure fluid from the cylinder chamber is discharged through the port so that the piston is resiliently stopped by the pressure fluid in the annular chamber, and then moved back.

7 Claims, 1 Drawing Figure

PATENTED AUG 27 1974 3,831,379
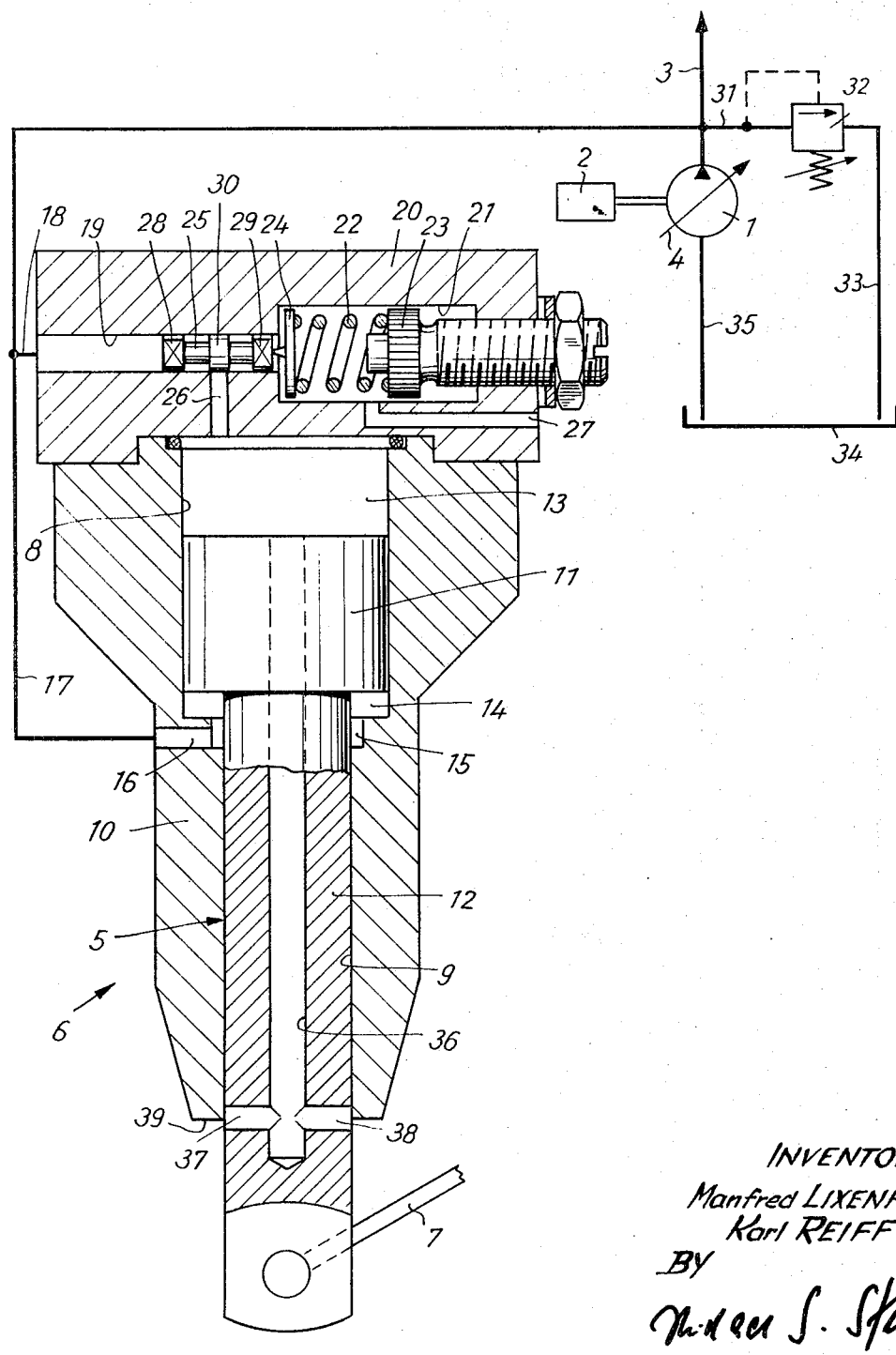
INVENTORS
Manfred LIXENFELD
Karl REIFF
BY
[signature]
their ATTORNEY

CONTROL APPARATUS FOR A HYDRAULIC MACHINE

BACKGROUND OF THE INVENTION

The present invention relates to a control apparatus for controlling the regulation of an adjustable hydraulic machine. It is known to regulate a hydraulic machine by means of a differential control piston whose annular effective surface is directly subjected to the high pressure of a consumer conduit system into which the hydraulic machine pumps fluid, while the circular effective piston surface is connected with the consumer conduit system by a pressure-responsive spring-biased valve. Regulating arrangements of this type are used for the pressure regulation of hydraulic machines, and the differential piston moves between two end positions, corresponding to the maximum and minimum stroke of the hydraulic machine, depending on the height of the pressure in the conduit system. When the differential piston arrives at an end position, corresponding to the smallest stroke and fluid output of the machine, it is stopped by a mechanical stop which causes strong impacts which may cause damage to parts of the regulating means of the hydraulic machine.

If the hydraulic machine is an adjustable pump, for example an axial piston pump, the minimum stroke is obtained when the output pressure is a maximum, while the maximum pressure is determined by a pressure-limiting valve connected with the conduit system. This causes undesired heating of the pumped fluid.

It is one object of the invention to provide a control apparatus for the regulating means of a hydraulic machine, in which no moving part is stopped with a great impace by a mechanical stop, and in which an undesired heating of the pressure fluid within a given operational range of the hydraulic machine, is prevented.

Another object is to provide a fluid cushion for stopping the differential piston in one end position.

Another object of the invention is to use the cylinder and piston means which effect the normal regulation of the hydraulic machine, also for limiting extreme pressure in the conduit system.

In accordance with the invention, a cylindrical pressure chamber bounded by the longer effective surface of a differential piston is connected only in one end position of a differential piston by a conduit in the same with a low-pressure space due to the fact that the port of the conduit cooperates with a stationary control edge of the cylinder.

Such a constructive arrangement requires no additional means for limiting the pressure, and is consequently very inexpensive. The arrangement has the further advantage that it can be used in already existent consumer conduit systems.

One embodiment of the control apparatus of the invention comprises a regulator for regulating a hydraulic machine for varying the amount of fluid flowing in its pressure conduit; a differential piston in a cylinder having a control edge portion forming in the cylinder an annular first pressure chamber communicating with the pressure conduit, and a second cylindrical pressure chamber, the control piston having a control port normally covered by the control edge portion of the cylinder, and a connecting conduit connecting the second chamber with the control port; and spring-biased pressure-responsive means having a first position connecting the pressure conduit with the second chamber and a second position connecting the second chamber with a low-pressure space.

When the pressure in the pressure conduit increases and decreases, respectively in relation to a normal value, the control piston is moved by the pressure differential between the first and second chambers in a first direction, and in an opposite second direction, respectively, to operate the regulator to reduce and increase, respectively, the flow in the pressure conduit.

At an extremely high pressure in the pressure conduit and second pressure chamber, the control piston moves in a first direction to an end position in which the control port is uncovered by the control edge portion of the cylinder. Fluid from the second chamber is now rapidly discharged from the control port into a low-pressure space, and the control piston is stopped by the pressure fluid in the first chamber, and then moves in the second opposite direction into said second pressure chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is partly an axial sectional view of a control apparatus according to the invention, and partly a diagram schematically illustrating the hydraulic circuit of a pump.

DESCRIPTION OF THE PREFERRED EMBODIMENTS

Referring now to the drawing, a hydraulic pump 1 is driven by a motor 2, and pumps a fluid into a consumer conduit 3 which is connected with consumer apparatus such as hydraulic motors, not shown. The pump 1 has a regulator 4 which is connected by linkage, not shown, with a lever 7, shown at the left lower end of the FIGURE and connected with a differential piston 5 in a cylinder means 10. Cylinder 10 and differential piston 5 constitute a power amplifier or booster for opening the regulator 4 of pump 1.

The differential piston 5 is guided for axial movement in a stepped cylindrical bore which has a larger portion 8, and a narrower portion 9 receiving the piston 11 and the piston rod 12, respectively, of the differential piston 5.

The piston 11 divides the cylinder bore portion 8 into a first annular pressure chamber surrounding piston rod 12, and a second cylindrical chamber 13. The annular pressure chamber 14 has an annular extension 15 surrounding piston rod 12 and opening into an inlet conduit 16 connected by conduit 17 with the consumer conduit 3 into which pump 1 discharges pressure fluid. Consequently, the pressure in the annular pressure chamber 14 corresponds to the pressure in the consumer pressure conduit 3.

A valve casing 20 is fixedly secured to the end of cylinder 10, and closes the second pressure chamber 13, which is sealed by a sealing ring surrounding pressure chamber 13.

Valve casing 20 has an inlet bore 19 connected by a conduit 18 with conduit 17 and consumer conduit 3. A slide 25 is mounted in inlet bore 19 for movement between two end positions, and an intermediate position shown in the drawing and closing a duct 26 connecting bore 19 and pressure conduit 18, 3 with the cylindrical pressure chamber 13.

The bore 19 opens into a larger bore 21 in which a spring 22 is located which has one end abutting a portion 23 of an adjustable screw which is threaded into a bore in casing 20. The tension of spring 22 can be manually adjusted by the adjusting means 23, so that the pressure acting on a spring plate 24 can be varied. Spring plate 24 has a projection projecting into bore 19 and abutting one end portion 28 of slide 25 which has another end portion 28 and a piston portion 30. End portions 28, 29 are substantially cylindrical, but have flat surfaces forming passages for the fluid in bore 19. The larger bore 21 has an outlet conduit 27 which opens into a low-pressure area and, for example, discharges into the reservoir 34 from which pump 1 sucks fluid through conduit 35. A pressure-limiting valve 32 is provided in a conduit 31 connecting the consumer conduit 3 with reservoir 34. A connecting conduit 36 extends in axial direction from the circular end face of piston 11 in chamber 13, to a point spaced from the end of the piston rod 12. Transverse ducts 37 and 38 open in ports on the outer surface of piston rod 12 and are disposed for cooperation with a control edge portion 39 of a tubular portion of cylinder 10 which surrounds the piston rod 12. Pressure fluid in chamber 13 can flow through connecting conduit 36 and ducts 38, 39 to a low-pressure area, for example into the reservoir 34, provided that the ports of ducts 37, 38 are uncovered by the control edge portion of the stationary cylinder 10. If piston 11 is in the middle of the pressure chamber 13, piston rod 12 is in a higher position than illustrated, so that the control edge portion 39 closes the ports of ducts 37, 38. The outer ends of ducts 37, 38 may be connected by an annular groove around piston rod 12 whose circular edges cooperate with the circular control edge portion 39.

During normal operational conditions, the pressure in consumer conduit 3 is directly applied through conduits 17, 16, 15 to the annular pressure chamber 14, so that the differential piston 5 is urged to move upward as viewed in the drawing. At the beginning of the operation, the duct 26 is closed by the piston portion 30 of slide 29. When the pressure in consumer conduit 3 is reaches a certain amount, the pressure fluid supplied through conduits 17 and 18 to the inlet portion of bore 19 is sufficient to move valve slide 25 against the action of the adjusted spring 22 to a position in which conduit 17, 18, 19 is connected with conduit 26 so that pressure fluid from consumer conduit 3 enters the cylindrical pressure chamber 13 so that in chamber 13 the same pressure prevails as in the annular pressure chamber 14 which directly communicates with consumer conduit 3 through conduit 17. Since the effective piston surface in chamber 13 is greater than the effective piston surface in the annular chamber 14, the differential piston 5 is displaced downward as viewed in the drawing and operates through the lever 7 the regulator 4 of the pump 1 so that the same discharges a smaller amount of fluid into the consumer conduit 3. However, the ports of ducts 38 are still closed by the control edge portion 39 of the cylinder means 10. When the amount pumped by pump 1 is reduced by regulator 7, 4, the pressure in conduit 17 and pressure chamber 13 drops to a desired value.

If the pressure in conduits 3, 17, 18 drops below a desired value, the force of spring 22 of the pressure regulating valve means 25, 20 is sufficient to move the slide 25 to the left as viewed in the drawing so that the duct 26 is connected with the bore portion 21 and the discharge outlet 27 whereby the pressure in chamber 13 is reduced. The flat face of end portion 29 of slide 25 permits the flow from duct 26 through bore 19 into bore 21. The pressure fluid discharged in this condition from pressure chamber 13 may flow into the reservoir 34 from which pump 1 sucks the fluid.

Since the pressure in chamber 13 is reduced in this manner, the pressure in the annular pressure chamber 14 is sufficient to move piston 11 and piston rod 12 upward as viewed in the drawing so that the regulator means 7, 4 are operated to increase the amount of fluid discharged by pump 1 into the consumer conduit 3. In view of the abovedescribed regulation of the pump output by means of the pressure-responsive means 25, 20 and cylinder and piston means 6, it will be apparent that pump 1 is pressure regulated.

In the event that the pressure rises in consumer conduit 3 above a predetermined maximum desired value, the pressure fluid supplied by conduit 18 into bore 19 displaces slide 25 to the right, as explained above, so that pressure fluid flows into chamber 13 and moves piston 11 and piston rod 12 downward. Before the bottom edge of piston 11 abuts the shoulder of the stepped cylinder bore 8, 9, ports 37, 38 of the downwardly moving piston rod 12 are partly uncovered by the stationary control edge portion 39 so that high-pressure fluid in chamber 13 can flow through connecting bore 36 for discharge through the ducts 37, 38 to a low-pressure area such as the reservoir 34. Since the pressure in pressure chamber 13 immediately drops, the differential piston 5 is stopped from further downward movement by the fluid cushion in the annular pressure chamber 14 which receives pressure fluid through conduit 17 directly from consumer conduit 3.

A position of equilibrium is assumed by the differential piston which, assuming that the areas of the effective surfaces of the piston 11 are given, depends only on the pressures in the pressure chambers 13 and 14.

This condition of equilibrium is on the one hand influenced by the flow cross-sections of the bore 19, of the passages formed by end portions 28, 29 of slide 25, and by the duct 26, and on the other hand by the flow control cross-section of the discharge outlet formed by the control edge portion 39 and the ports of ducts 37, 28. When the flow cross-section between control edge portion 39 and the ports of ducts 37, 38 is increased, the pressure in pressure chamber 13 drops immediately, and the pressure in the annular pressure chamber 14 is sufficient to move the differential piston 5 upward, so that the free-flow cross-section and the control edge portion 39 is again reduced.

This position of the differential piston 5 is an end position in which pump 1 pumps the smallest possible amount of fluid. This end position is not determined by a mechanical stop, as in the prior art, but by a so-called hydraulic stop, determined by the ports of ducts 37, 38 and by the control edge portion 39. It is evident that the differential piston 5 is yieldingly stopped without any hard impact, so that no part of the regulating means can be damaged.

This manner of regulation is known as zero-stroke regulation, and the magnitude of the pressure required for placing the differential piston 5 in the respective end position is determined by the adjustment of the spring 22, in contrast to prior-art apparatus in which the regulation is determined by a pressure-limiting valve. The control apparatus according to the invention obtains the advantageous result that the pressure at which the regulating means adjusts the smallest possible discharge volume is lower than in conventional apparatus so that undesired heating of the pressure fluid is prevented.

The apparatus of the invention may also be used for other types of regulation, for example for regulating a pump to a constant amount of pumped fluid.

It will be understood that each of the elements described above, or two or more together, may also find a useful application in other types of control arrangements for hydraulic machines differing from the types described above.

While the invention has been illustrated and described as embodied in a control apparatus for regulating an adjustable pump to maintain substantially uniform pressure in its discharge conduit, and for adjusting the pump to a minimum output when the pressure exceeds a predetermined maximum pressure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of th generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Control apparatus comprising a hydraulic machine having a pressure conduit; regulator means for regulating said machine to vary the amount of fluid flowing in said pressure conduit; cylinder means having a stepped bore and a tubular portion formed at an end thereof with a control edge portion; a differential control piston means including a stepped control piston in said stepped cylinder bore and forming in said cylinder means an annular first pressure chamber communicating with said pressure conduit, and a second cylindrical pressure chamber, and stepped control piston having a piston rod portion surrounded by said tubular portion and formed with a control port means normally covered by said control edge portion, and a connecting conduit connecting said second chamber with said control port means; connecting means connecting said piston means with said regulator means; and pressure-responsive means having a first position connecting said pressure conduit with said pressure chamber and a second position connecting said second pressure chamber with a low-pressure space, and including means biasing said pressure-responsive means toward said second position so that when the pressure in said pressure conduit increased and decreases, respectively, in relation to a normal value, said control piston means is moved by the pressure differential between said first and second pressure chambers in a first direction and in an opposite second direction, respectively, to operate said regulator means to reduce and increase, respectively, the flow in said pressure conduit, and so that an extremely high pressure in said pressure conduit and second pressure chamber, said control piston means moves in said first direction to an end position in which said control port means is uncovered by said control edge portion of said cylinder means and fluid from said second pressure chamber is rapidly discharged from said control port means into a low-pressure space and said control piston means is stopped from further movement in said first direction by the pressure fluid present in said first pressure chamber, to be subsequently moved the the pressure of the pressure fluid in said first pressure chamber in said second opposite direction as the pressure drops in said second pressure chamber due to discharge of the pressure fluid from said control port means.

2. Control apparatus as claimed in claim 1, wherein said connecting conduit extends in axial direction through said piston portion and said piston rod portion and ends in the latter; and wherein said control port means include radial duct means connected with the end of said connecting conduit and having at least one port on the outer surface of said piston rod portion cooperating with said control edge portion.

3. Control apparatus as claimed in claim 1, wherein said biasing means includes a spring, and manual adjusting means for said spring.

4. Control apparatus as claimed in claim 1, wherein said pressure-responsive means includes a valve casing secured to said cylinder means and having an inlet communicating with said pressure conduit, an outlet communicating with said low-pressure space, and a duct connected with said second pressure chamber, a valve slide in said valve casing, and a spring biasing said valve slide toward said first position in which said inlet is connected by said duct with said second pressure chamber, and yielding to high pressure in said inlet and pressure conduit to connect said duct with said outlet in said second position.

5. Control apparatus as claimed in claim 4, wherein said pressure-responsive means further include manual adjusting means for adjusting the pressure of said spring.

6. Control apparatus as claimed in claim 5, wherein said spring abuts said valve slide; and wherein said adjusting means includes a screw threaded into said casing and having one end abutting said spring and another end located outside of said casing and being manually operable.

7. Control apparatus as claimed in claim 4, wherein said valve slide forms passages between said inlet and said duct, and between said outlet and said duct; and wherein at least said inlet and said duct form a throttling passage.

* * * * *